US012763696B2

(12) United States Patent
Kristensen

(10) Patent No.: US 12,763,696 B2
(45) Date of Patent: Oct. 13, 2026

(54) AC-DC POWER CONVERTER

(71) Applicant: Axis AB, Lund (SE)

(72) Inventor: Henrik Kristensen, Lund (SE)

(73) Assignee: AXIS AB, Lund (SE)

(*) Notice: Subject to any disclaimer, the term of this patent is extended or adjusted under 35 U.S.C. 154(b) by 100 days.

(21) Appl. No.: 18/932,695

(22) Filed: Oct. 31, 2024

(65) Prior Publication Data

US 2025/0211129 A1 Jun. 26, 2025

(30) Foreign Application Priority Data

Dec. 21, 2023 (EP) .................................... 23218941

(51) Int. Cl.

| | |
|---|---|
| ***H02M 3/158*** | (2006.01) |
| ***H02M 1/14*** | (2006.01) |
| ***H02M 1/42*** | (2007.01) |
| ***H02M 7/217*** | (2006.01) |

(52) U.S. Cl.

CPC ............. *H02M 7/217* (2013.01); *H02M 1/14* (2013.01); *H02M 1/4208* (2013.01); *H02M 3/158* (2013.01)

(58) Field of Classification Search

None

See application file for complete search history.

(56) References Cited

U.S. PATENT DOCUMENTS

| | | | | |
|---|---|---|---|---|
| 8,300,438 | B1 | 10/2012 | Herbert | |
| 8,593,125 | B1 | 11/2013 | Xue | |
| 2005/0168087 | A1 | 8/2005 | Yasumura | |
| 2011/0080102 | A1* | 4/2011 | Ge | H05B 45/46 315/200 R |
| 2017/0079095 | A1 | 3/2017 | Fang et al. | |
| 2020/0295651 | A1 | 9/2020 | Garg et al. | |
| 2022/0376614 | A1* | 11/2022 | Kobayashi | H02M 1/08 |
| 2022/0418070 | A1 | 12/2022 | Pang et al. | |
| 2023/0124775 | A1* | 4/2023 | Mino | H02M 3/33576 363/13 |

FOREIGN PATENT DOCUMENTS

| | | | |
|---|---|---|---|
| CN | 109660132 | A | 4/2019 |
| CN | 111901932 | A | 11/2020 |
| JP | 2000-125547 | A | 4/2000 |

OTHER PUBLICATIONS

Extended European Search Report mailed on Jun. 11, 2024, received for EP Application 23218941.5, 10 pages.

* cited by examiner

*Primary Examiner* — Nguyen Tran

(74) *Attorney, Agent, or Firm* — XSENSUS LLP

(57) ABSTRACT

An AC-DC power converter includes: a rectification circuit configured to convert an input AC voltage to a rectified AC voltage; a power factor correction boost converter circuit configured to convert the rectified AC voltage to a first boosted DC voltage, wherein the first boosted DC voltage has AC ripple; a switched mode power supply output stage having a transformer; a buck and/or boost converter having two input voltage terminals, wherein a first voltage input terminal is connected to the first boosted DC voltage or to a secondary side of the transformer, and wherein a second input voltage terminal is connected to a second DC voltage, wherein the second DC voltage is higher than the voltage on the first voltage input terminal within a predefined voltage range, and wherein the buck and/or boost converter uses pulse width modulation to generate an output DC voltage with reduced AC ripple.

15 Claims, 5 Drawing Sheets

AC-DC POWER CONVERTER

CROSS-REFERENCE TO RELATED APPLICATION

This application claims priority to European Patent Application No. 23218941.5, filed on Dec. 21, 2023, the entire disclosure of which is incorporated by reference herein.

The present disclosure relates to an AC-DC power converter with improvements related to the reduction or elimination of AC ripple. The disclosure further relates to a method of converting an input AC voltage to an output DC voltage.

BACKGROUND

An AC-DC power converter is a device that transforms alternating current (AC) into direct current (DC). AC-DC power converters are crucial for the operations of many electronic devices. AC-DC power converters may involve, for example, rectifiers, switch-mode power supplies and stages involving transformers for stepping up or down the voltage.

An AC-DC power converter may typically involve a first rectification stage for eliminating the negative half-cycles of the incoming original AC voltage. The voltage after the rectification stage may therefore typically be a voltage in which the negative halves of the AC waveform have been converted into positive halves. For a mains voltage of 50 Hz the rectified voltage will therefore typically have a frequency of approximately 100 Hz, but only positive voltage.

The rectified voltage may then be further converted, for example, using a boost converter or other type of switched-mode power supply. The resulting DC voltage of such further conversion will still have some ripple or variation in its magnitude caused by the original AC voltage. Reducing or eliminating such ripple on the converted DC voltage is essential for ensuring the stability and reliability of electronic devices powered by the converted DC voltage.

In order to reduce ripple, the load side may involve filters, for example, capacitor-based filters, which can be used to smooth out voltage variations. The larger the capacitor's capacitance value, the better it can filter out the ripple. The filtering to reduce ripple may, however, result in considerable efficiency loss in the power converter. The consequence of that is not only that energy is lost, but also that the lost energy is converted to heat, which may affect the converter or other components in a negative way. It would thus be beneficial to be able to reduce the losses in a power converter caused by ripple on the DC voltage.

JP 2000 125547 A discloses a circuit for reducing ripple components in a DC voltage from a rectifying smoothing circuit of a DC converter. A DC voltage containing the ripple voltage of a phase opposite to that of a ripple voltage contained in a DC voltage outputted from a second rectifying smoothing circuit is outputted from a chopper circuit via a capacitor and it is added to a DC voltage outputted from a first rectifying smoothing circuit via a capacitor.

US 2022/418070 A1 discloses an apparatus with a power supply circuit, which is connected with a light emitting diode (LED) drive circuit, a filter circuit and a feedback circuit in the display apparatus. The power supply circuit includes a fixed-voltage power supply element and a variable-voltage power supply element. The topology includes one or more buck circuits.

CN 111 901 932 A also discloses a power supply circuit, which is connected with a light emitting diode (LED) drive circuit, a filter circuit and a feedback circuit in the display apparatus. The power supply circuit includes a fixed-voltage power supply element and a variable-voltage power supply element. The topology includes one or more buck circuits.

SUMMARY

The present disclosure relates to an AC-DC power converter with improved built-in reduction or elimination of ripple on the DC voltage.

The present disclosure relates to, according to a first embodiment, an AC-DC power converter comprising:

- a rectification circuit configured to convert an input AC voltage to a rectified AC voltage;
- a power factor correction boost converter circuit configured to convert the rectified AC voltage to a first boosted DC voltage, wherein the first boosted DC voltage comprises AC ripple;
- a switched mode power supply output stage comprising a transformer;
- a buck and/or boost converter having two input voltage terminals, wherein a first voltage input terminal is connected to the first boosted DC voltage, and wherein a second input voltage terminal is connected to a second DC voltage, wherein the second DC voltage is higher than the voltage on the first voltage input terminal within a predefined voltage range, wherein the buck and/or boost converter is configured to be operated using pulse width modulation to generate an output DC voltage with reduced or eliminated AC ripple, and wherein the output DC voltage is forwarded to the switched mode power supply output stage.

Buck converters are conventionally used to step down voltage levels in various applications. In the presently disclosed AC-DC power converter the intention is not to step down the DC voltage. Instead, the AC-DC converter is configured to provide a second DC voltage, which is slightly higher than the voltage on the first voltage input terminal. The output DC voltage from the buck converter is a voltage level between the voltage levels (i.e., between the magnitude or amplitude of the voltages) on the first voltage input terminal and the second input terminal, i.e. a voltage that is slightly higher than the voltage on the first voltage input. One reason for adding the slightly higher voltage and a buck and/or boost converter is that it offers an efficient way of reducing or eliminating the ripple over a limited voltage range. In case a boost converter is used, the output DC voltage from the boost converter may instead by slightly higher than the voltage on the second input terminal. A number of variants of buck converters and boost converters exist, also including combinations, which are sometimes referred to as buck-boost converters. The presently disclosed AC-DC power converter may use any suitable variant of buck and/or boost converters to generate the output DC voltage with reduced or eliminated AC ripple. For example, the buck and/or boost converter may be a synchronous buck converter or a buck converter with diode rectification. Alternatively, or in combination, the buck and/or boost converter may be a synchronous boost converter or a boost converter with diode rectification.

The buck and/or boost converter has two input voltage terminals. The first voltage input terminal may be connected to the first boosted DC voltage. In order to explain the operation of the AC-DC power, a first illustrative, non-limiting, example is provided in FIG. 1. If the input AC voltage is a mains AC voltage of, for example, 220 V or 240 V, the first boosted DC voltage may then be a DC voltage in the range of 300-500 V, for example, approximately 400 V, with AC ripple. If the second input voltage terminal of the buck and/or boost converter is then connected to a second DC voltage, which is slightly higher than the voltage on the first voltage input terminal within a predefined voltage range, for example 5-50 V higher than the first boosted DC voltage, the buck and/or boost converter will, due to the nature of how a buck and/or boost converter operates, inherently reduce or eliminate the ripple, and it will do so over a limited voltage, namely the difference between the first and second voltage input terminals of the buck and/or boost converter. The power losses in the added buck and/or boost converter may be considerably lower compared to using a filter for reducing the ripple on the output DC signal on the load side.

As stated above, the AC-DC power converter may comprise a switched mode power supply output stage comprising a transformer. The switched mode power supply output stage may be configured to step down the voltage level from the buck and/or boost converter, which, as explained above, may be in the order of 300-500 V and slightly more due to the additional 5-50 V on the second input voltage terminal of the buck converter, to an output voltage level used by an electronic device, which may be in the order of, for example, 40-60 V.

The present disclosure further relates to a method of converting an input AC voltage to an output DC voltage, the method comprising the steps of:

providing an AC-DC power converter comprising:
- a rectification circuit configured to convert an input AC voltage to a rectified AC voltage;
- a power factor correction boost converter circuit configured to convert the rectified AC voltage to a first boosted DC voltage, wherein the first boosted DC voltage comprises AC ripple;
- a switched mode power supply output stage comprising a transformer; and
- a buck and/or boost converter having two input voltage terminals, wherein a first voltage input terminal is connected to the first boosted DC voltage, and wherein a second input voltage terminal is connected to a second DC voltage, wherein the second DC voltage is higher than the voltage on the first voltage input terminal within a predefined voltage range, and wherein an output DC voltage of the buck and/or boost converter is forwarded to the switched mode power supply output stage;

operating the AC-DC power converter by adjusting switching of one or more switches in the buck and/or boost converter to generate the output DC voltage with reduced or eliminated AC ripple.

A person skilled in the art will recognize that the presently disclosed method of converting an input AC voltage to an output DC voltage may be performed using any embodiment of the presently disclosed AC-DC power converter, and vice versa.

BRIEF DESCRIPTION OF DRAWINGS

Various embodiments are described hereinafter with reference to the drawings. The drawings are examples of embodiments and are intended to illustrate some of the features of the presently disclosed AC-DC power converter.

DETAILED DESCRIPTION

The present disclosure relates to an AC-DC power converter.

Figure 1:
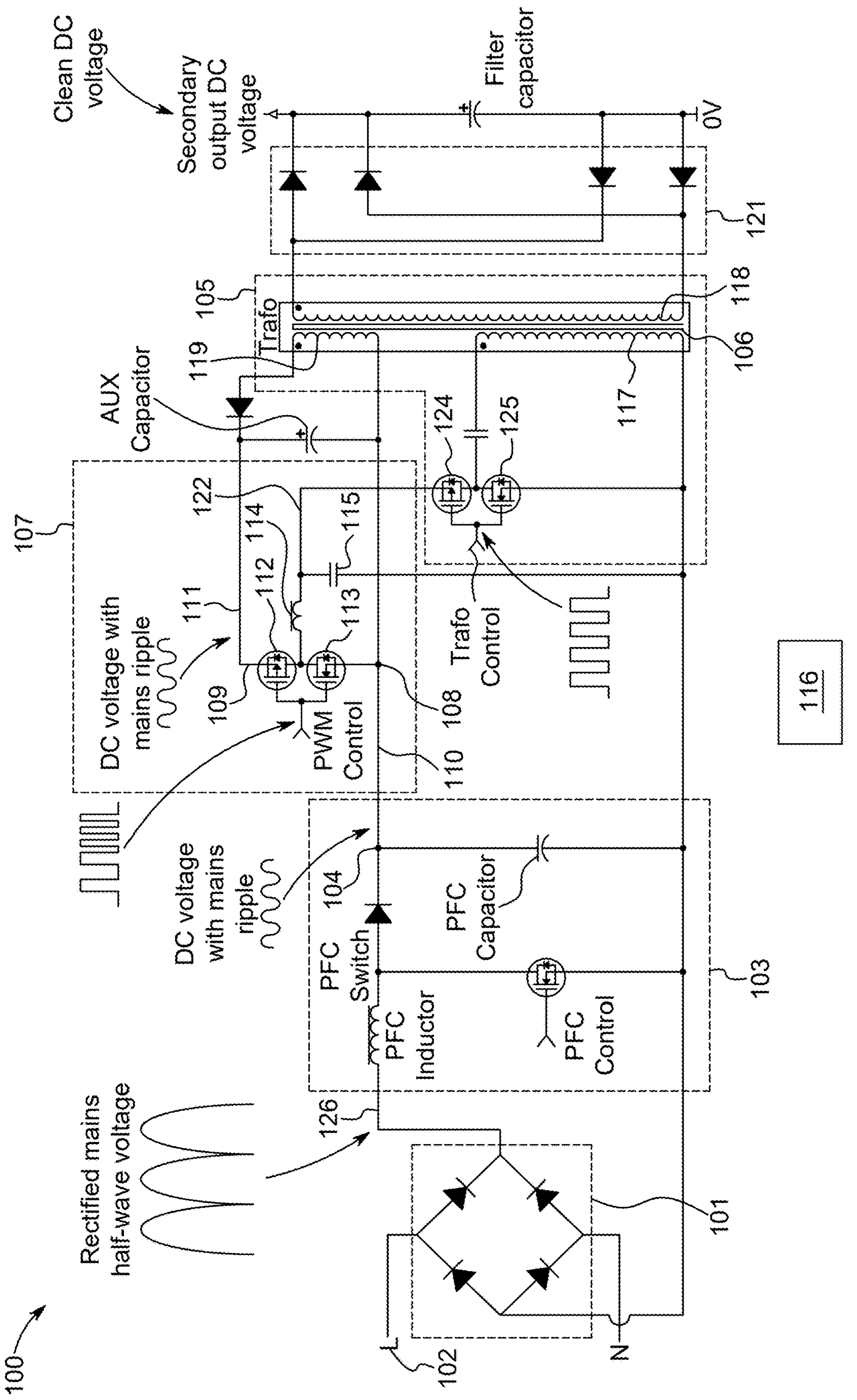
FIG. 1 shows an example of a first embodiment of the AC-DC power converter.

The AC-DC power converter comprises a rectification circuit configured to convert an input AC voltage to a rectified AC voltage. A power factor correction (PFC) boost converter circuit converts the rectified AC voltage to a first boosted DC voltage. The first boosted DC voltage may be higher and more constant than the rectified AC voltage but may still comprise an AC ripple. A PFC boost converter improves the power factor of the load. A PFC boost converter is a converter that increases the voltage of an input voltage while shaping the current to be in phase with the voltage. The PFC boost converter operates by switching a semiconductor switch, for example, a MOSFET, on and off. Control circuitry may be configured to regulate the switching of the semiconductor switch. The energy is stored in an inductor and transferred to a capacitor. An example of a PFC boost converter 103 is shown in FIG. 1. A person skilled in the art would generally be familiar with PFC boost converters and would be able to implement suitable variants of PFC boost converters.

The AC-DC power converter may further comprise a switched mode power supply output stage comprising a transformer. A switched mode power supply works by switching a DC voltage on and off, typically using a semiconductor switch, such as a MOSFET. The DC voltage is switched on and off using a pulse-width modulated signal. The switched DC voltage is then passed through the transformer. High-frequency switching allows for efficient energy transfer through the transformer. The presently disclosed AC-DC power may comprise control circuitry configured to regulate the switching of the semiconductor switch. The role of the switched mode power supply is to convert the voltage level from the PFC boost converter to a different level. As an example, the voltage from the PFC boost converter may be in the range of 300-500 V, for example, approximately 400 V, whereas the voltage needed for the load may be lower, such as in the range of 40-70 V. The switched mode power supply output stage has the advantage that it may provide electrical isolation between the input and the output of the power converter. The isolation is achieved because the primary side of the transformer is electrically separated from the secondary side. An example of a switched mode power supply output stage 105 is shown in FIG. 1. A person skilled in the art would generally be familiar with switched mode power supplies and would be able to implement variants of the switched mode power supply output stage.

The AC-DC power converter further comprises a buck and/or boost converter having two input voltage terminals. According to a first embodiment, a first voltage input terminal is connected to the first boosted DC voltage, i.e. the boosted voltage from the PFC boost converter, which may be in the order of 300-500 V. A second input voltage terminal is connected to a second DC voltage, which is higher than the voltage on the first voltage input terminal within a predefined voltage range.

In case the buck and/or boost converter is a synchronous buck converter, the synchronous buck converter may comprise a first switch; a second switch, an inductor, and a smoothing capacitor. The first switch may be connected between the first voltage input terminal and a common node and the second switch connected between the second input voltage terminal and the common node, wherein the inductor is connected between the common node and the output DC voltage, and wherein the smoothing capacitor is connected between the output DC voltage and a reference or 0V terminal. The AC-DC power converter may further comprise control circuitry configured to alternately turn on and off the first and second switches. In case the buck and/or boost converter is a buck converter with diode rectification or a boost converter with diode rectification, the control circuitry may be configured to alternately turn on and off a single switch in the converter. FIG. 1 shows an example of a synchronous buck converter 107. In this example the synchronous buck converter 107 comprises a first switch 112, a second switch 113, an inductor 114 and a smoothing capacitor 115. The first switch may be connected between the first voltage input terminal and a common node and the second switch may be connected between the second input voltage terminal and the common node, wherein the inductor is connected between the common node and the output DC voltage, and wherein the smoothing capacitor is connected between the output DC voltage and a reference or 0V terminal. The AC-DC power converter may comprise control circuitry configured to alternately turn on and off the first and second switches. A buck converter, such as a synchronous buck converter, is, generally, a converter for stepping down a voltage from a higher voltage to a lower voltage. In the presently disclosed AC-DC power converter the operation of the buck converter may be used to remove the AC ripple on the first boosted DC voltage. The output DC voltage is stabilized by the switching of the buck converter. One advantage is that the elimination can be done over a limited voltage, i.e. the difference between the first and second voltage input terminals of the buck converter.

Figure 4:
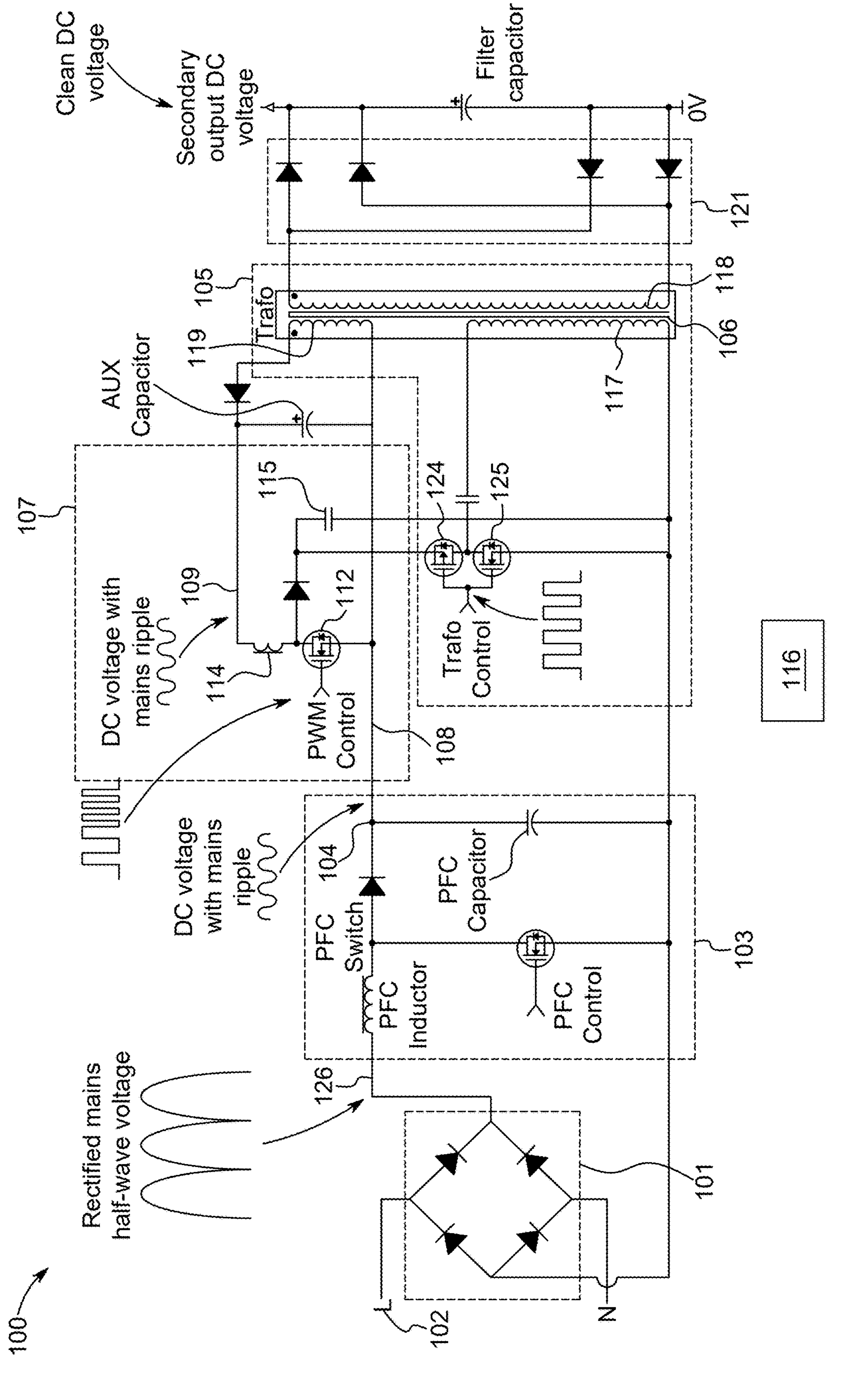
FIG. 4 shows an example of a fourth embodiment of the AC-DC power converter.

Alternatively, the buck and/or boost converter may be a boost converter, such as a boost converter with diode rectification or a synchronous boost converter. FIG. 4 shows an example of the presently disclosed AC-DC power 100 converter using a boost converter 107. In this example the boost converter 107 is a boost converter with diode rectification comprising a first switch 112, an inductor 114 and a smoothing capacitor 115. The first switch may be connected between the first voltage input terminal and a common node and the inductor 114 may be connected between the second voltage input and the common node. The output DC voltage as well as the smoothing capacitor 115 may be connected to the common node. It is understood that the second DC voltage may be provided by the transformer 106, such as from the primary side of the transformer 106 or from the secondary side of the transformer 106, or from the PFC boost converter circuit 103.

If, for example, the first boosted DC voltage from the PFC boost converter is in the range of 300-500 V and the second DC voltage is 5-50 V higher, the output DC voltage will have a DC voltage level between the voltages on the first voltage input terminal and the second. If, for example, the first boosted DC voltage from the PFC boost converter is 400 V and the second DC voltage is 430 V, the output DC voltage will be somewhere between 400 V and 430 V depending on how the first and second switches are switched, in the case of a buck converter. In case of a boost converter, the output DC voltage will be slightly higher than the second DC voltage. The output DC voltage is a useful and ripple free voltage to pass on to the switched mode power supply output.

Figure 3:
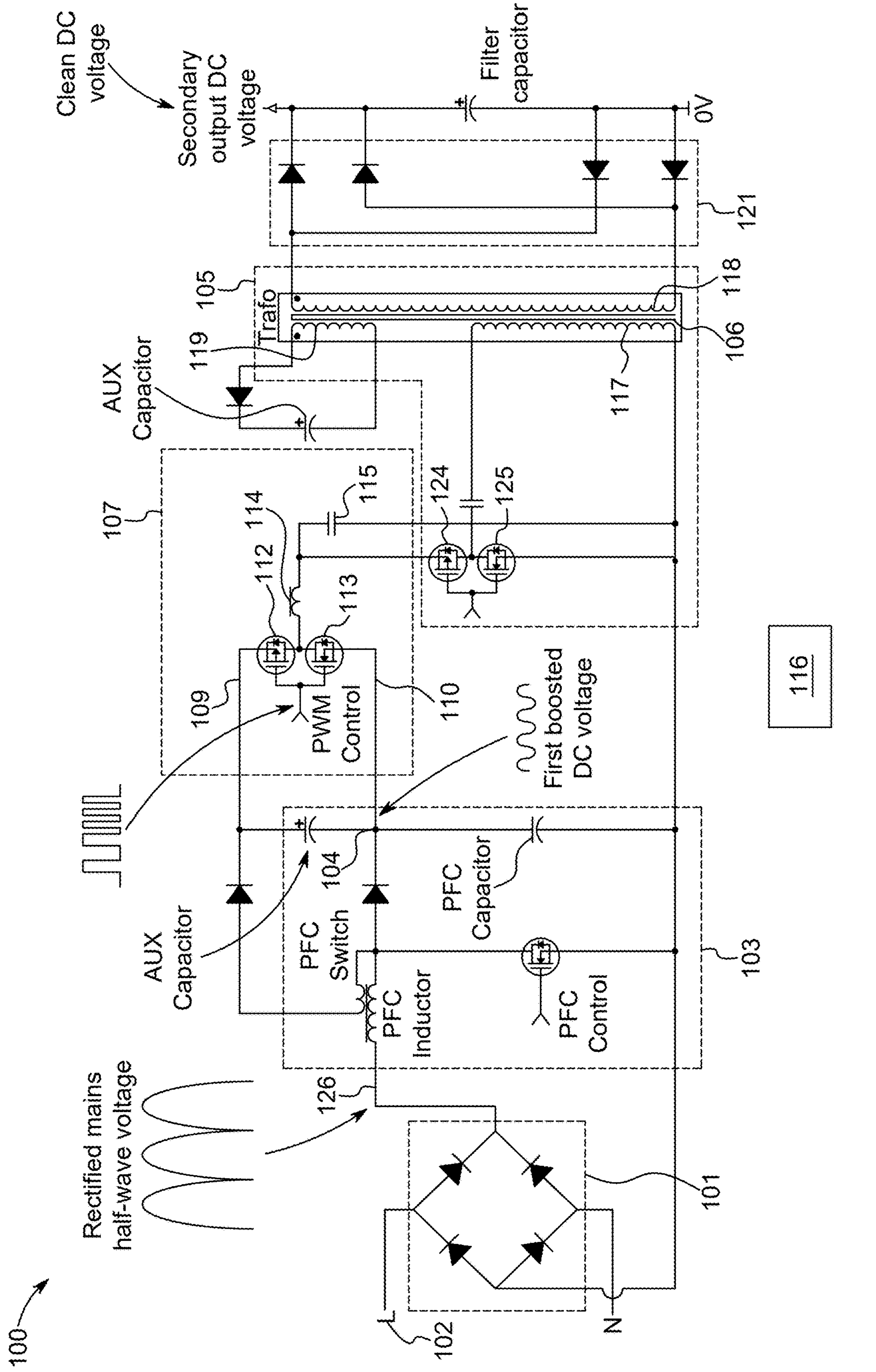
FIG. 3 shows an example of a third embodiment of the AC-DC power converter.

There are several options for obtaining the second DC voltage, which are valid both for buck converter embodiments and boost converter embodiments. The second input voltage terminal may be connected to a node or connection point in the transformer in the switched mode power supply output stage to provide the second DC voltage to the buck and/or boost converter. This may involve having an additional winding on the primary side of the transformer in the switched mode power supply output stage. An example of this is shown in FIG. 1. A further possibility is to obtain it from the PFC boost converter, for example, a slightly converted voltage from the coil of the inductor in the PFC boost converter. The second input voltage terminal may thus be connected to a node or connection point in the PFC boost converter. An example of this is shown in FIG. 3. In FIG. the second input voltage terminal 109 is connected to a supplemental winding of the PFC inductor in the PFC boost converter circuit 103. The connections of the first voltage input terminal and the second voltage input terminal are possible for a boost converter as well.

The voltage on the secondary side of the transformer in the switched mode power supply output stage is typically lower than the first boosted DC voltage from the PFC boost converter. As an example, the voltage from the PFC boost converter may be in the range of 300-500 V, whereas the voltage needed for the load may be lower, such as in the range of 40-70 V.

The operation of the buck and/or boost converter may be based on pulse width modulation to generate an output DC voltage having a DC voltage level between the voltages on the first voltage input terminal and the second input terminal with reduced or eliminated AC ripple. The AC-DC power converter may comprise control circuitry configured to apply pulse width modulation to the buck and/or boost converter, wherein the control circuitry senses the output DC voltage and continuously regulates the buck and/or boost converter to provide a desired output DC voltage. By adjusting the width of the pulses, the output DC voltage can be regulated. A person skilled in the art would generally be familiar with such operation. For example, the control circuit may use a target voltage, which is the desired output voltage. The control circuit can then adjust the switching of the first switch and second switch to regulate the output voltage. The fast switching of the switches and the inductor and smoothing capacitor may provide a relatively stable DC output voltage.

The operation of the switched mode power supply output stage is similar to that of the buck and/or boost converter. The switched mode power supply output stage may comprise one or more actively controlled switching elements, for example a high-side switch 124 and a low-side switch 125, as shown in the example of FIG. 1, for controlling current flow in a primary side of the transformer. Preferably, the actively controlled switching elements are controlled by pulse width modulation or fixed duty cycle. Control circuitry may be configured to control the switching of the switching elements. A person skilled in the art would generally be familiar with such operation.

On the secondary side of the switched mode power supply output stage there may be an output rectification circuit connected to a secondary side of the transformer. Since the power conversion on a switched mode power supply is a variant of AC-DC conversion, the role of the output rectification circuit is to convert the alternating voltage to a DC voltage. This is usually implemented as a number of diodes arranged in a specific configuration.

The example of FIG. 1, which shows an example of a first embodiment of the AC-DC power converter 100, includes a number of waveforms illustrating how the AC ripple is eliminated. It shall be noted that FIG. 1 comprises a number of subsystems, for example, a rectification circuit 101, a PFC boost converter circuit 103, a synchronous buck converter 107, a switched mode power supply output stage 105, and an output rectification circuit 121. As a person skilled in the art would realize, each of the subsystems can be implemented in various ways. A specific implementation of, for example, the synchronous buck converter 107, which is the subsystem that reduces or eliminates the AC ripple, does not necessarily require the exact implementation of the other subsystems, for example, the rectification circuit 101 in FIG. 1.

In the example of FIG. 1 the input AC voltage may be a mains AC voltage. The waveform for the input AC voltage is not included in the figure but may be, for example, a sine wave. The voltage after the rectification stage may be a voltage in which the negative halves of the AC waveform have been converted into positive halves. In FIG. 1 the rectified AC voltage 126 is accompanied by an illustration of a typical waveform of such a voltage. The next stage in the AC-DC converter 100 is the PFC boost converter circuit 103, which produces a first boosted DC voltage 104. The first boosted DC voltage 104 has a higher voltage than the input voltage but still comprises a low-frequency AC ripple, as illustrated in FIG. 1. The first boosted DC voltage 104 can be used as input voltage on the first voltage input terminal 108 of the synchronous buck converter 107. In order to have second DC voltage 111, which is slightly higher than the voltage on the first voltage input terminal 108, a secondary winding 119 on the primary side of the transformer 106 is used. There may be other options for generating or obtaining a slightly higher voltage. In the example of FIG. 1, the second DC voltage 111 also has a low-frequency AC ripple, but this is not necessary. The second DC voltage 111 is provided to second voltage input terminal 109. The output of the synchronous buck converter 107 is an output DC voltage 122 which does not have any AC ripple, as illustrated in FIG. 1. The output DC voltage 122 is then forwarded to the switched mode power supply output stage 105, more specifically to the high-side switch 124. It can be seen that the output of the switched mode power supply output stage 105 and the output rectification circuit is also a ripple-free voltage.

More generally, possible voltage levels of the various voltages in the presently disclosed AC-DC power converter would be clear to a person skilled the art familiar with the operation and functionality of the different parts of the AC-DC power converter. According to one embodiment, the input AC voltage is in the range of 100-240 V with a frequency in the range of 50-60 Hz, wherein the AC ripple in the first boosted DC voltage is a low-frequency AC ripple having a frequency in the range of 100-120 Hz. The first boosted voltage, which is higher than the input AC voltage, may be in the range of 300-500 V, such as approximately 400 V. The second DC voltage to the buck and/or boost converter need to be slightly higher than the first DC voltage. For example, second DC voltage may be 5-50 V higher than the first boosted DC voltage.

Figure 2:
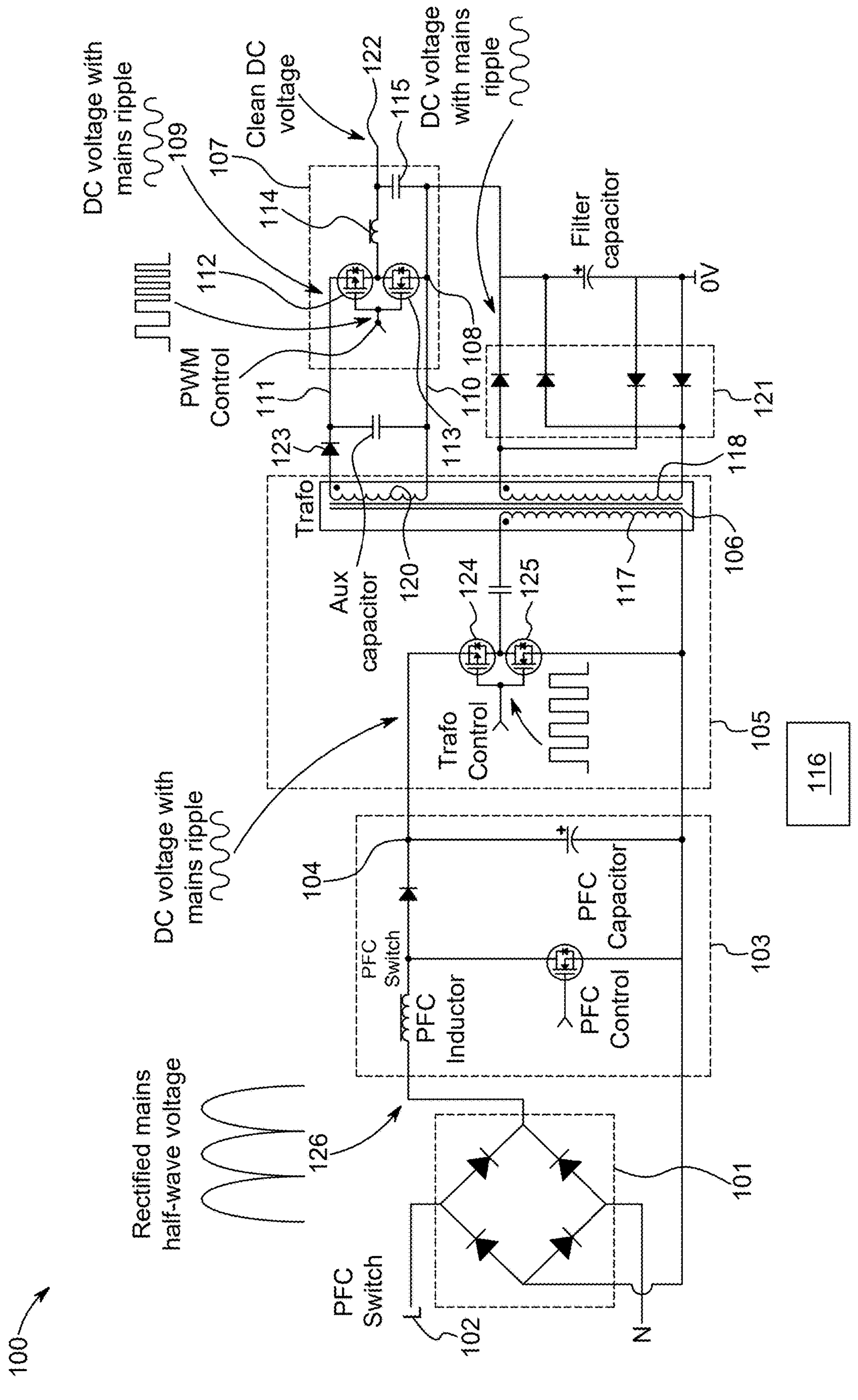
FIG. 2 shows an example of an AC-DC power converter which is not covered by the claims.

The first voltage input terminal may be connected to a secondary side of the transformer, preferably via one or more rectifier components, wherein the secondary side of the transformer provides a voltage on the first voltage input terminal in the range of 40-70 V, and wherein the second DC voltage is 5-20 V higher than then the voltage on the first voltage input terminal. This embodiment is shown in FIG. 2. More generally, the buck converter may be configurated to operate over a reduced voltage span compared to the voltage on the first voltage input terminal, such as a voltage span less than 20% of the voltage on the first voltage input terminal.

Figure 5:
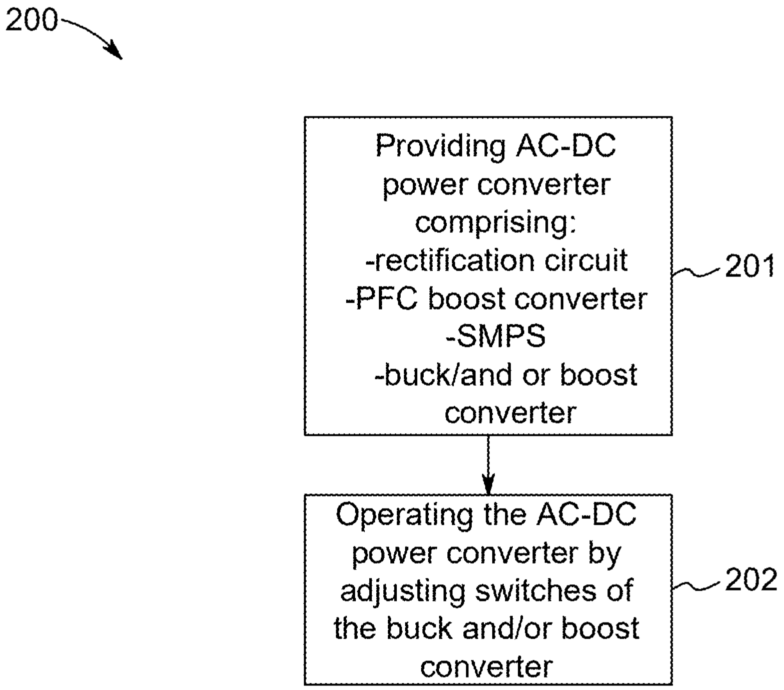
FIG. 5 shows an example of a flow chart of the presently disclosed method of converting an input AC voltage to an output DC voltage.

FIG. 5 shows an example of a flow chart of the presently disclosed method 200 of converting an input AC voltage to an output DC voltage. The method in FIG. 5 comprises the steps of providing an AC-DC power converter comprising: a rectification circuit configured to convert an input AC voltage to a rectified AC voltage; a power factor correction boost converter circuit configured to convert the rectified AC voltage to a first boosted DC voltage, wherein the first boosted DC voltage comprises AC ripple; a switched mode power supply output stage comprising a transformer; and a buck and/or boost converter having two input voltage terminals, wherein a first voltage input terminal is connected to the first boosted DC voltage, or wherein the first voltage input terminal is connected to a secondary side of the transformer, and wherein a second input voltage terminal is connected to a second DC voltage (201); and operating the AC-DC power converter by adjusting switching of one or more switches in the buck and/or boost converter to switch between a voltage on the first voltage input terminal and the second DC voltage, thereby generating an output DC voltage having a DC voltage level between the voltage on the first voltage input terminal and the second DC voltage with reduced or eliminated AC ripple (202).

The presently disclosed AC-DC converter may comprise control circuitry to control the different voltage levels and generate pulses to control the PFC boost converter circuit and/or the switched mode power supply output stage and/or the buck and/or boost converter. The control circuitry may be part of the AC-DC converter itself or a separate part of a system. The control circuitry may be or comprise processing circuitry, for example, a single processor or a processor in a multi-core/multiprocessor system.

The presently disclosed AC-DC power converter may be used in various applications, including, for example, as part of a charger for an electronic device, or in power sourcing equipment, such as a midspan, which enables an existing network to support Power over Ethernet PoE, or as part of a built-in AC-DC power converter in an electronic device.

LIST OF ELEMENTS IN FIGURES

100—AC-DC power converter
101—rectification circuit
102—input AC voltage
103—PFC boost converter circuit
104—first boosted DC voltage
105—switched mode power supply output stage
106—transformer
107—buck/boost converter
108—first voltage input terminal
109—second voltage input terminal
110—first DC voltage
111—second DC voltage
112—first switch
113—second switch
114—inductor
115—smoothing capacitor
116—control circuitry
117—primary winding primary side
118—primary winding secondary side
119—secondary winding primary side

120—secondary winding secondary side
121—output rectification circuit
122—output DC voltage
123—rectifying diode
124—high-side switch
125—low-side switch
126—rectified AC voltage

The invention claimed is:

1. An AC-DC power converter comprising:

a rectification circuit configured to convert an input AC voltage to a rectified AC voltage;

a power factor correction boost converter circuit configured to convert the rectified AC voltage to a first boosted DC voltage, wherein the first boosted DC voltage comprises AC ripple;

a switched mode power supply output stage comprising a transformer;

a buck and/or boost converter having two input voltage terminals, wherein a first voltage input terminal is connected to the first boosted DC voltage, and a second input voltage terminal is connected to a second DC voltage, wherein the second DC voltage is higher than the voltage on the first voltage input terminal within a predefined voltage range, wherein the buck and/or boost converter is configured to be operated using pulse width modulation to generate an output DC voltage with reduced or eliminated AC ripple, and wherein the output DC voltage is forwarded to the switched mode power supply output stage.

2. The AC-DC power converter according to claim 1, wherein the second input voltage terminal is connected to a node or connection point in the transformer to provide the second DC voltage to the buck and/or boost converter.

3. The AC-DC power converter according to claim 1, wherein the switched mode power supply output stage comprises one or more actively controlled switching elements for controlling current flow in a primary side of the transformer, preferably wherein the one or more actively controlled switching elements are controlled by pulse width modulation or fixed duty cycle.

4. The AC-DC power converter according to claim 1, further comprising an output rectification circuit connected to a secondary side of the transformer.

5. The AC-DC power converter according to claim 1, wherein the second input voltage terminal is connected to a node or connection point in the power factor correction boost converter circuit.

6. The AC-DC power converter according to claim 1, further comprising control circuitry configured to apply pulse width modulation to the buck and/or boost converter, wherein the control circuitry senses the output DC voltage and continuously regulates the buck and/or boost converter to provide a desired output DC voltage.

7. The AC-DC power converter according to claim 1, wherein the buck and/or boost converter is a buck converter comprising a first switch, a second switch, an inductor, and a smoothing capacitor, or a boost converter comprising a first switch, a second switch, an inductor, and a smoothing capacitor.

8. The AC-DC power converter according to claim 7, wherein the first switch is connected between the first voltage input terminal and a common node and the second switch connected between the second input voltage terminal and the common node, wherein the inductor is connected between the common node and the output DC voltage, and wherein the smoothing capacitor is connected between the output DC voltage and one of the first voltage input terminal and the second input voltage terminal or a reference or 0V terminal.

9. The AC-DC power converter according to claim 7, further comprising control circuitry configured to alternately turn on and off the first and second switches.

10. The AC-DC power converter according to claim 1, wherein the input AC voltage is in the range of 100-240 V with a frequency in the range of 50-60 Hz, and wherein the AC ripple in the first boosted DC voltage is a low-frequency AC ripple having a frequency in the range of 100-120 Hz.

11. The AC-DC power converter according to claim 1, wherein the first boosted DC voltage is in the range of 300-500 V, and wherein the second DC voltage is 5-50 V higher than the first boosted DC voltage.

12. The AC-DC power converter according to claim 1, wherein the first voltage input terminal is connected to a secondary side of the transformer, preferably via one or more rectifier components, wherein the secondary side of the transformer provides a voltage on the first voltage input terminal in the range of 40-70 V, and wherein the second DC voltage is 5-20 V higher than then the voltage on the first voltage input terminal.

13. The AC-DC power converter according to claim 1, wherein the buck and/or boost converter operates over a reduced voltage span compared to the voltage on the first voltage input terminal, such as a voltage span less than 20% of the voltage on the first voltage input terminal.

14. A method of converting an input AC voltage to an output DC voltage, the method comprising the steps of:

providing an AC-DC power converter comprising:

a rectification circuit configured to convert an input AC voltage to a rectified AC voltage;

a power factor correction boost converter circuit configured to convert the rectified AC voltage to a first boosted DC voltage, wherein the first boosted DC voltage comprises AC ripple;

a switched mode power supply output stage comprising a transformer; and a buck and/or boost converter having two input voltage terminals, wherein a first voltage input terminal is connected to the first boosted DC voltage, and wherein a second input voltage terminal is connected to a second DC voltage, wherein the second DC voltage is higher than the voltage on the first voltage input terminal within a predefined voltage range, and wherein an output DC voltage of the buck and/or boost converter is forwarded to the switched mode power supply output stage;

operating the AC-DC power converter by adjusting switching of one or more switches in the buck and/or boost converter to generate the output DC voltage with reduced or eliminated AC ripple.

15. The method of converting an input AC voltage to an output DC voltage according to claim 14.

* * * * *